United States Patent Office 3,684,477
Patented Aug. 15, 1972

3,684,477
MICROORGANISM CONTROL
John H. Blumbergs, Highland Park, N.J., and Donald G. MacKellar, Yardley, Pa., assignors to FMC Corporation, New York, N.Y.
No Drawing. Continuation-in-part of application Ser. No. 661,233, Aug. 17, 1967. This application Aug. 28, 1969, Ser. No. 853,978
Int. Cl. A01n 11/00, 5/00, 13/00, 9/00
U.S. Cl. 71—67                                    6 Claims

ABSTRACT OF THE DISCLOSURE

A method for controlling the growth of microorganisms, particularly in aqueous systems, by contacting the microorganisms with:
(a) hydrogen peroxide (or a compound capable of releasing hydrogen peroxide in water), and
(b) one of a class of organic compounds containing at least one acetyl group and capable of giving a value of at least one ml. in the "Activity Test" defined below.

CROSS-REFERENCE TO RELATED APPLICATIONS

This application is a continuation-in-part of application No. 661,233 filed Aug. 17, 1967, now abandoned, in the names of John H. Blumbergs and Donald G. MacKellar.

BACKGROUND OF THE INVENTION

(A) Field of the invention

This invention relates to controlling the growth of microorganisms, particularly in aqueous systems, by contacting said microorganisms with two compounds that together have a bactericidal effect.

(B) Description of the prior art

Many compounds having commonly been used as bactericides to control the growth of microorganisms, such as quaternary ammonium compounds, phenol, chlorinated phenols, hypochlorites, peracetic acid and chlorine. However, these compounds have not been found entirely suitable for a variety of reasons. For example, many bactericides are not compatible with other required chemical additives, e.g., corrosion inhibitors; others such as phenol and chlorinated phenol are not effective during extended use except in large quantities; others such as chlorine and peracetic acid are difficult to use in the field except with special supply tanks and/or dispensing systems because they either are liquified under pressure, decompose readily, or are serious lachrymators. Others, notably chlorine and hypochlorite, are highly corrosive when in contact with metallic equipment.

OBJECTS OF THE INVENTION

It is an object of the present invention to prevent the growth of microorganisms in aqueous systems by the simple addition of two chemical compounds that together produce a bactericidal effect.

It is a further object to prevent the growth of microorganisms by the addition of a bactericide that is effective in small quantities.

It is another object to prevent the growth of microorganisms, whether they be bacteria, fungi or algae, by contacting said microorganisms with additives that are essentially non-corrosive in contact with metal equipment used in the field and which are easily stored, handled and used by workmen without requiring protective or safety equipment of any type.

These and other objects will be apparent from the following description of the invention.

SUMMARY OF THE INVENTION

We have now found that these objects can indeed be attained, and the growth of microorganisms controlled in an aqueous system by adding an effective amount of:
(A) hydrogen peroxide (or a compound capable of releasing hydrogen peroxide in aqueous solution), with
(B) an organic acetyl-containing compound which is
 (a) an acetyl organoamide having the formula:

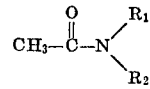

where $R_1$ is an acyl radical and $R_2$ is an acyl radical, an alkyl group of 1–6 carbon atoms, or phenyl, and these further may be substituted with fluorine, chlorine, bromine, cyano, ntiro carboxyl or phenyl groups; the $R_2$ radical ca nalso be joined with $R_1$ to form a ring, or
 (b) an acetylated phenol, substituted phenol or substituted aliphatic alcohol having the formula:

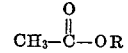

where R is a phenyl, substituted phenyl or substituted aliphatic group having electron-attracting substituents thereon,
 (c) an acetyl ester having the formula:

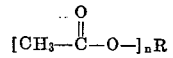

wherein R is a carbohydrate or polyhydric aliphatic alcohol residue, $n$ is at least 4, and at least one of said

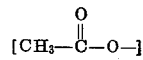

groups is attached to each of at least four vicinal carbon atoms of R, or
 (d) isopropenyl acetate,
and which gives a titer of at least 1 ml. in the "Activity Test."

DESCRIPTION OF THE INVENTION AND THE PREFERRED EMBODIMENTS

In the present invention it has been found that certain acetyl-containing organic compounds, in an aqueous medium, will combine with hydrogen peroxide or an inorganic salt capable of producing hydrogen peroxide in aqueous solution, to form an extremely potent bactericide. Weh ave found further that the desired acetyl-containing organic compounds having sufficient "activity" to be effective in the present process can be identified by means of an "Activity Test." The "Activity Test" is a measure of the acetyl-containing organic compound's ability to react with a hydrogen peroxide-yielding inorganic salt, namely sodium perborate tetrahydrate, and is carried out as follows:

One thousand milliliters of distilled water are added to a one-liter beaker equipped with a magnetic stirrer and one gram milliequivalent of the acetyl-containing compound is added to the water. If the acetyl-containing compound is water insoluble, it can be first be dissolved in 10 cc. of a lower, water-soluble alcohol and the alcoholic solution dispersed in 990 cc. of $H_2O$ in the beaker. The gram-equivalent calculation is based on having one reactive acetyl group present per atom of available active oxygen present in solution.

The aqueous solution, or dispersion, is stirred for two hours at 30° C. and then one millimole (0.154 g.) of sodium perborate tetrahydrate is added. After additional stirirng for 15 minutes, a 200 ml. aliquot is removed and transferred to a beaker containing crushed ice. Fifty ml. of 5% sulfuric acid is added to the aliquot, and any unreacted hydrogen peroxide is titrated with 0.1 N ceric sulfate solution using Ferroin as the indicator as described in Anal. Chem. 20, 1061 (1948). After reaching the end-point, 10 ml. of an aqueous 10% potassium iodide solution is added, and the liberated iodine titrated with 0.1 N sodium thiosulfate solution using starch as the indicator.

The acetyl-containing organic compounds which are sufficiently "active" to be effective are those that yield a titer in the above "Activity Test" of at least 1 ml.

The acetyl-containing organic compounds that are encompassed within the scope of the present invention are those that satisfy the titer requirement of the "Activity Test" and which are selected from one of the following groups:

(I) An aceytl organo amide having the formula:

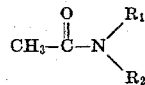

wherein $R_1$ is an acyl radical and $R_2$ is an organic radical as defined below.

These compounds are the combination of an acetic acid residue with an organic, substituted, amomnia compound containing at least one acyl radical attached to the nitrogen atom. The term "acylradical" is intended to cover residues derived from an organic acid. The remaining $R_2$ radical attached to the nitrogen atom may be an acyl radical, an alkyl group of 1–6 carbon atoms or phenyl, and these further may be substituted with fluorine, chlorine, bromine, cyano, nitro, carboxyl of phenyl groups. The $R_2$ radical can also be joined with $R_1$ to form a ring. Additionally, the substitutents must not reduce the activity of the compound below that which will meet the titer requirement of the "Activity Test." Examples of useful acetyl organo amides are:

Triacetamide
N-methyl diacetamide
N,N,N',N'-tetraaceytlmethylene diamine
N,N,N',N'-tetraacetylethylene diamine
N,N,N',N'-tetraacetylhydrazine
N,N,N',N'-tetraacetyl-p-phenylene diamine
Diacetyl formamide
N,N,N',N'-tetraacetyl-2,4-toluene diamine
N-acetylsuccinimide
N-acetylphthalimide
N,N'-diacetyl dimethylhydantoin
N-acetyl-N-methyl-p-toluenesulfonamide
N,N,N',N'-tetraacetyl, 6-chloro, 2,4-toluene diamine
N,N,N',N'-tetraacetyl, 6-bromo, 2,4-toluene diamine
N,N,N',N'-tetraacetyl, 6-cyano, 2,4-toluene diamine
N,N,N',N'-tetraacetyl, 6-nitro, 2,4-toluene diamine
N,N,N',N'-tetraacetyl, 2-chloro, P-phenylene diamine
N,N,N',N'-tetraacetyl, 2-cyano, P-phenylene diamine
N,N,N',N'-tetraacetyl, 2-nitro, P-phenylene diamine
N,N,N',N'-tetraacetyl, 2-isopropyl, P-phenylene diamine
N-hexyl diacetamide (II) An acylated phenol, substituted phenol or substituted aliphatic alcohol having the formula:

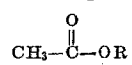

where R is phenyl, substituted phenyl or substituted aliphatic group having electron-attracting substituents thereon.

The electron-attracting substituents which may be present on the alcohol or phenols include the following: fluorine, chlorine, bromine, cyano, nitro and carboxylic acid groups.

Compounds which have been found useful include the following: phenyl acetate, o-chlorophenyl acetate, p-chlorophenyl acetate, o-nitrophenyl acetate, p-nitrophenyl acetate, p-cyanophenyl acetate, trichloroethyl acetate, and trifluoroethyl acetate. Compounds in which R is an unsubstituted aliphatic group in general, have not been found to have titers sufficient to pass the "Activity Test."

(III) An acylated ester having the formula:

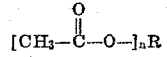

wherein R is a carbonhydrate or a polyhydric aliphatic alcohol residue, $n$ is at least 4, and at least one of said

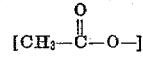

groups is attached to each of at least four vincinal carbon atoms of R.

Examples of suitable compounds are: glucose tetraacetate, glucose penta acetate, fructose penta acetate, sucrose octa acetate, mannitol hexa acetate and sorbitol hexa acetate.

(IV) Isopropenyl acetate.

In carrying out the present invention, one of the above compounds which meets the titer requirements of the "Activity Test," is added to the aqueous body to be treated along with hydrogen peroxide in an aqueous solution. Upon addition of these two additives it is desirable to maintain the aqueous body under alkaline conditions at a pH of from 7.5 to 9.5 in order to obtain best results. The optimum pH will be that which gives the highest titer value in the "Activity Test" for the specific, organic acetyl-containing compound used.

The pH of the solution may be adjusted to optimum conditions by adding sodium hydroxide or an acid such as $H_2SO_4$. In many cases, the addition of certain alkaline, hydrogen peroxide releasing salts, such as sodium perborate tetrahydrate, is sufficient to increase the pH to the desired alkaline level. The resultant aqueous mixture is allowed to remain for at least about 15 minutes to permit the reagents to react and to kill the microorganisms in the aqueous body. Thereafter, the remaining solution can be adjusted to any desired pH level for further use. The alkaline conditions in the water are desirable in order to allow the organic, acetyl-containing compound to reach optimum reaction conditions and activity. After the reaction of the two additives has taken place, the pH of the aqueous body need not be under alkaline conditions.

In the preferred method of carrying out the present invention to control the growth of bacteria in aqueous bodies which are heavily contaminated, the organic acetyl-containing compound is first added to the water, and the compound is allowed to circulate throughout the entire water system. Thereafter, $H_2O_2$ itself or a compound capable of releasing $H_2O_2$ in water, such as sodium perborate tetrahydrate, is then added to the aqueous solution. Sodium perborate tetrahydrate is desirable in that it performs two functions simultaneously. It initially raises the pH of the aqueous solution to the desired alkaline level and also reacts with the acetyl-containing additive to effect the bactericidal action. It is generally not desired to add the sodium perborate tetrahydrate first, because the hydrogen peroxide released in situ by this compound would be dissipated in undesired reactions with oxidizable impurities. During circulation of the water in a cooling tower system the two reagents have sufficient time to react and to produce the bactericidal effect desired.

The compounds that are useful in the present invention to release hydrogen peroxide in an aqueous medium include the alkali and alkaline earth metal salts, and particularly the sodium and potassium salts of perborates, percarbonates, persilicates, orthophosphate perhydrates, pyrophosphate perhydrates, polyphosphate perhydrates and sulfate perhydrates. The alkali and alkaline earth metal peroxides are also useful, such as sodium peroxide, potassium peroxide, calcium peroxide and zinc peroxide.

Certain organic peroxides which have been found useful include urea peroxide and melamine peroxide.

These compounds can be true peroxygen salts that liberate hydrogen peroxide by reaction with water; alternately, they can be inorganic or organic compounds that merely contain hydrogen peroxide in their crystal structure, in the same way that water of crystallization is held in a crystal. In either case, these compounds will function in the present process regardless of the crystal structure so long as hydrogen peroxide is released when the compound is mixed with water. In the present specification and claims the term "hydrogen peroxide" is intended to include $H_2O_2$, as well as the above salts that can liberate $H_2O_2$ in water.

The ratio of hydrogen peroxide or hydrogen peroxide-liberating compound to the organic, acetyl-containing compound is a 1:1 ratio based on equivalents of compounds used; each acetyl group is considered as an equivalent. However, in applications where the water contains easily oxidizable materials, such that some of the added hydrogen peroxide would be dissipated, higher proportions of hydrogen peroxide to acetyl-containing compound than 1:1 equivalents are desirable, e.g., a ratio of 1:0.5 to 1:0.9.

The precise concentration of the active ingredients which are required to control the growth of bacteria depend on the specific application. For the control treatment of circulating industrial cooling tower water approximately one milliequivalent of each active ingredient is sufficient to check bacteria, fungi and algae growth. However, for general clean up of these waters, where they are heavily contaminated and have algae growth and other undesirable microorganisms, higher concentrations on the order of about 2 milliequivalents of each of the added components must be used. In other applications, for example, in controlling the growth of bacteria in the water used for secondary oil recovery, less than one milliequivalent of each of the active ingredients can be used. This amount will check the growth of sulfate-reducing bacteria. The desirable range of each of these active ingredients in use may vary from 0.4 to 2 milliequivalents per liter of water treated. In other applications, such as for general disinfectant use in hospitals, restaurants, food industries, etc., an aqueous disinfecting solution is made up containing these additives, and the solution is applied wherever the germicidal action is desired. In such germicidal solutions at least about one milliequivalent of each of the active ingredients is required depending on the type of microorganisms present and the intensity of the bactericidal action desired.

The following examples are given to illustrate the invention and are not deemed to be limiting thereof.

EXAMPLE 1

Run A.—A number of organic acetyl-containing compounds were tested to determine their titer in the "Activity Test." The "Activity Test" was conducted as set forth in the specification, using one milliequivalent of the compound and 0.154 g. of sodium perborate tetrahydrate. The pH of the solution used and the titer obtained are set forth in Table 1.

TABLE 1

| Compound tested | Concentration Milliequivalents | Concentration Grams per liter | pH | Activity test titer (ml. of $Na_2S_2O_3$) |
|---|---|---|---|---|
| Run A: | | | | |
| N,N,N',N'-tetraacetylethylene diamine | 1 | 0.114 | 9.1 | 2.2 |
| N,N,N',N'-tetraacetylmethylene diamine | 1 | 0.107 | 9.0 | 2.3 |
| Triacetamide | 1 | 0.143 | 8.7 | 2.1 |
| Trichloroethyl acetate | 1 | 0.192 | 9.0 | 1.6 |
| Phenyl acetate | 1 | 0.136 | 9.0 | 1.1 |
| o-Chlorophenyl acetate | 1 | 0.170 | 8.8 | 2.0 |
| Glucose penta acetate | 1 | 0.195 | 9.0 | 1.7 |
| Sucrose octa acetate | 1 | 0.229 | 9.0 | 1.2 |
| Isopropenyl acetate | 1 | 0.100 | 9.0 | 1.9 |
| Run B: | | | | |
| Triacetyl cyanurate | 1 | 0.085 | 8.2 | 0.2 |
| Ethyl acetate | 1 | 0.088 | 9.1 | 0 |

These compounds were then used to treat a sample of contaminated, industrial cooling tower water using the following procedure. One liter of the bacteria, fungi and algae contaminated water having a pH of 6.6 was placed in a 1.5 liter beaker. An aliquot of this water was analyzed for total bacterial count by the method described in American Petroleum Institute, R.P. 38, Biological Analysis of Water-Flood Injection Waters, p. 4, May 1959—"General Bacterial Counts of Injection Waters." To the water was added one milliequivalent of one of the organic acetyl derivatives listed below. The solution was stirred for two hours and then 1.5 milliequivalent of sodium perborate tetrahydrate was added. The pH of the solution after addition of the perborate was 8.0 to 9.2, depending on the compound tested. After continued stirring for 15 minutes the solution was acidified with phosphoric acid to the original pH of 6.6, and the stirring was continued for an additional 60 minutes. The treated water was then analyzed again for total bacterial count as defined above. This procedure was repeated with each of the organic, acetyl-containing derivatives listed below. The results are presented in Table 2.

The above organic, acetyl-containing compounds were also used to treat samples of the same cooling tower water in the absence of any added sodium perborate. These compounds were found to have substantially little killing power in the absence of the added sodium perborate.

Run B.—The procedure of Run A was repeated using two organic, acetyl-containing compounds which do not give a titer of at least 1 in the "Activity Test." The results of the titer and of the bacterial counts taken after using these compounds described above are set forth in Table 2.

Run C.—The procedure of Run A was repeated except that equivalent amounts of potassium perborate and potassium peroxide were substituted for sodium perborate tetrahydrate. The results obtained were the same as when sodium perborate tetrahydrate was used.

TABLE 2

| Compound tested | Concentration, g./liter | Na-perborate tetrahydrate, g./liter | Organisms per ml. before treatment | Organisms per ml. after treatment | Percent kill |
|---|---|---|---|---|---|
| Run A: | | | | | |
| N,N,N'N' tetraacetylethylene diamine | 0.114 | 0.23 | 322,300 | 0 | 100 |
| N,N,N',N'-tetraacetylethylene diamine | 0.114 | 0.23 | 322,300 | 0 | 100 |
| N,N,N',N'-tetraacetylmethylene diamine | 0.107 | 0.23 | 316,200 | 0 | 100 |
| Triacetamide | 0.143 | 0.23 | 320,200 | 0 | 100 |
| Trichloroethyl acetate | 0.192 | 0.23 | 342,300 | 0 | 100 |
| Glucose penta acetate | 0.195 | 0.23 | 340,200 | 0 | 100 |
| Phenyl acetate | 0.136 | 0.23 | 343,200 | 0 | 100 |
| Isopropenyl acetate | 0.100 | 0.23 | 338,400 | 0 | 100 |
| Sodium perborate blank | | 0.23 | 342,700 | 262,200 | 23.5 |
| Run B: | | | | | |
| Ethyl acetate | 0.088 | 0.23 | 318,300 | 240,300 | 24.5 |
| Triacetyl cyanurate | 0.085 | 0.23 | 321,200 | 186,300 | 42 |

EXAMPLE 2

Run A.—The germicidal activity of a solution prepared from hydrogen peroxide and each of the compounds set forth in Example 1, Run A were tested by the phenol coefficient method described in Association of Official Agricultural Chemists (A.O.A.C.), 9th edition, 1960. In this procedure one millimole of the test compound was dissolved in sterile, distilled water by stirring for two hours at room temperature. Thereafter, one millimole of hydrogen peroxide was added, and the pH of the solution was adjusted to 9.0 with sodium hydroxide. After stirring for 15 minutes at room temperature, the solution was used as the stock solution in the phenol coefficient tests, as set forth in A.O.A.C.-"Phenol Coefficient-Official."

In carrying out these tests the total weight of the test compound was calculated on the basis of a 100% active ingredient based on the total weight of the test compound and hydrogen peroxide used in preparing the stock solution. The phenol coefficients obtained are set forth in Table 3.

In addition to the above the germicidal activity of each of the above compounds was tested by the phenol coefficient method, but wherein no hydrogen peroxide was used with the compounds. The results indicated that the compounds, when used alone, had phenol coefficients on the tested organisms of less than 10.

Run B.—The procedure of Run A was repeated using ethyl acetate and triacetylcyanurate. These compounds are not within the scope of the present invention since they do not have a titer above one in the "Activity Test." The titer value of these compounds in the "Activity Test" is set forth in Table 1. The phenol coefficient obtained with these compounds is set forth in Table 3.

TABLE 3

| Compound tested | Grams/ liter | Hydrogen peroxide, g./liter | Phenol coefficient | | |
| --- | --- | --- | --- | --- | --- |
| | | | Staphylo- coccus aureus, ATCC No. 6538 | Salmonella typhosa, ATCC No. 6539 | Pseudo- monas aeruginosa, ATCC |
| Run A: | | | | | |
| N,N,N',N'-tetraacetylethylene diamine | 0.114 | 0.034 | 228 | 167 | 78 |
| N,N,N',N'-tetraacetylmethylene diamine | 0.107 | 0.034 | 239 | 174 | 81 |
| Triacetamide | 0.143 | 0.034 | 192 | 152 | 71 |
| Trichloroethyl acetate | 0.192 | 0.034 | 164 | 122 | 56 |
| Glucose penta acetate | 0.195 | 0.034 | 160 | 120 | 65 |
| Phenyl acetate | 0.136 | 0.034 | 122 | 87 | 26 |
| H₂O₂ blank | | 10.0 | 7 | 5 | 2 |
| Run B: | | | | | |
| Ethyl acetate | 0.088 | 0.034 | 8 | 6 | 2 |
| Triacetyl cyanurate | 0.085 | 0.034 | 26 | 19 | 5 |

As will be seen from the above examples, the compounds of Run B that do have not titer values of at least one ml. in the "Activity Test" materially lower bactericidal effect and phenol coefficient effect than do the other compounds.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A method for controlling the growth of microorganisms selected from the group consisting of bacteria, fungi and algae in an aqueous medium which comprises contacting said microorganism with:
   (a) hydrogen peroxide, and
   (b) an organic, acetyl-containing compounds having a titer of at least 1 ml. of sodium thiosulfate in the "Activity Test" and selected from the group consisting of:
      (1) an acetyl organoamide selected from the group consisting of
         Triacetamide,
         N-methyl diacetamide,
         N,N,N',N'-tetraacetylmethylene diamine,
         N,N,N',N'-tetraacetylethylene diamine,
         N,N,N',N'-tetraacetylhydrazine,
         N,N,N',N'-tetraacetyl-p-phenylene diamine,
         Diacetyl formamide,
         N,N,N',N'-tetraacetyl-2,4-toluene diamine,
         N-acetylsuccinimide,
         N-aetylphthalimide,
         N,N'-diacetyl dimethylhydantoin,
         N-acetyl-N-methyl-p-toluenesulfonamide,
         N,N,N',N'-tetraacetyl, 6-chloro,2,4-toluene diamine,
         N,N,N',N'-tetraacetyl, 6-bromo, 2,4-toluene diamine,
         N,N,N',N'-tetraacetyl, 6-cyano,2,4-toluene diamine,
         N,N,N',N'-tetraacetyl, 6-nitro,2,4-toluene diamine,
         N,N,N',N'-tetraacetyl, 2-chloro, p-phenylene diamine,
         N,N,N',N'-tetraacetyl, 2-cyano, p-phenylene diamine,
         N,N,N',N'-tetraacetyl, 2-nitro, p-phenylene diamine,
         N,N,N',N'-tetraacetyl, 2-isopropyl, p-phenylene diamine, and
         N-hexyl diacetamide,
      (2) an acetylated monohydric compound of the formula:

$$CH_3-\overset{O}{\underset{\|}{C}}-OR$$

where R is selected from the group consisting of phenyl, substituted phenyl and substituted aliphatic groups wherein said substituents are electron-attracting groups selected from the group consisting of fluorine, chlorine, bromine, cyano, nitro and carboxyl,
      (3) an acetyl ester of the formula:

$$[CH_3-\overset{O}{\underset{\|}{C}}-O-]_n R$$

wherein R is selected from the group consisting of carbohydrates and polyhydric alcohol residues, $n$ is an integer of 4 to 8, and at least one of said $$[CH_3-\overset{O}{\underset{\|}{C}}-O-]$$

groups is attached to each of at least four vicinal carbon atoms of R, and (4) isopropenyl acetate,
in an aqueous medium containing compounds (a) and (b) in a concentration of about from 0.4 to 2 milliequivalent each per liter, and in equivalent ratios of 1:05 to 1:1 and wherein said aqueous medium has a pH of from about 7.5 to about 9.5.

2. The method of claim 1 wherein said hydrogen peroxide is supplied by dissolving sodium perborate tetrahydrate in said aqueous medium.

3. The method of claim 1 wherein said organic, acetyl-containing compound is N,N,N′,N′-tetraacetylethylene diamine.

4. The method of claim 1 wherein said organic, acetyl-containing compound is N,N,N′,N′-tetraacetylmethylene diamine.

5. The method of claim 1 wherein said organic, acetyl-containing compound is triacetamide.

6. The method of claim 1 wherein said organic, acetyl-containing compound is isopropenyl acetate.

References Cited

UNITED STATES PATENTS

| | | | |
|---|---|---|---|
| 877,703 | 1/1908 | Budde | 424—130 |
| 1,297,735 | 3/1919 | Relyea | 424—170 |
| 2,379,294 | 6/1945 | Gooding | 99—224 |
| 2,867,653 | 1/1959 | Büttner et al. | 260—488 |
| 2,917,428 | 12/1959 | Hitzman | 424—130 |
| 3,350,265 | 10/1967 | Rubinstein et al. | 424—130 |

FOREIGN PATENTS

| | | | |
|---|---|---|---|
| 907,356 | 10/1962 | Great Britain | 424—130 |
| 129,043 | 4/1945 | Australia | 424—311 |

ALBERT T. MEYERS, Primary Examiner

F. E. WADDEL, Assistant Examiner

U.S. Cl. X.R.

424—130, 180, 273, 274, 304, 311, 320, 321, 324

UNITED STATES PATENT OFFICE
CERTIFICATE OF CORRECTION

Patent No. 3,684,477                Dated  August 15, 1972

Inventor(s)  John H. Blumbergs and Donald G. MacKellar

It is certified that error appears in the above-identified patent and that said Letters Patent are hereby corrected as shown below:

Column 2, line 17 "ntiro" should read --nitro--.

Column 2, line 18 "ca nalso" should read --can also--.

Column 2, line 52 "Weh ave" should read --We have--.

Column 2, line 64 ", it can be first be" should read --it can first be--.

Column 3, line 34 "of" should read --or--.

Column 5, line 44 "disinfectaing" should read --disinfecting--.

Columns 5 and 6, Table 2 "N,N,N',N'-tetraacetylethylene diamine" second occurrence should be omitted.

Column 7, line 54 "Activity Test" materially" should read --"Activity Test" have materially --.

Column 8, line 14 "N-aetylphthalimide" should read --N-acetylphthalimide--.

Signed and sealed this 31st day of December 1974.

(SEAL)
Attest:

McCOY M. GIBSON JR.
Attesting Officer

C. MARSHALL DANN
Commissioner of Patents